Oct. 28, 1952
D. J. CARLSON ET AL
2,615,933
BATTERY HEATING SYSTEM
Filed Sept. 29, 1949
2 SHEETS—SHEET 1
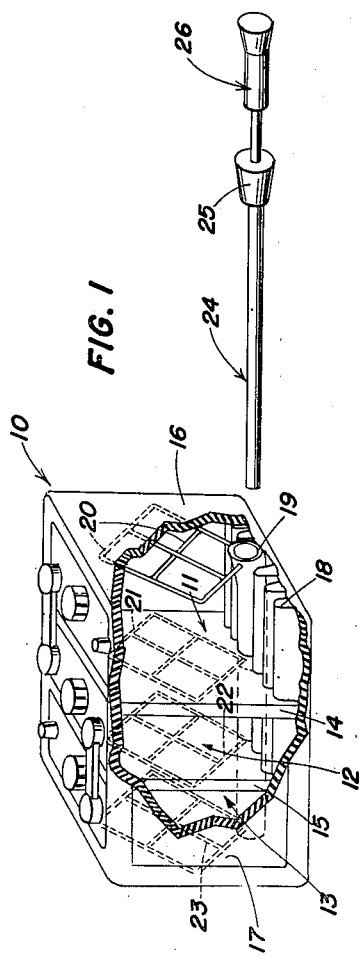
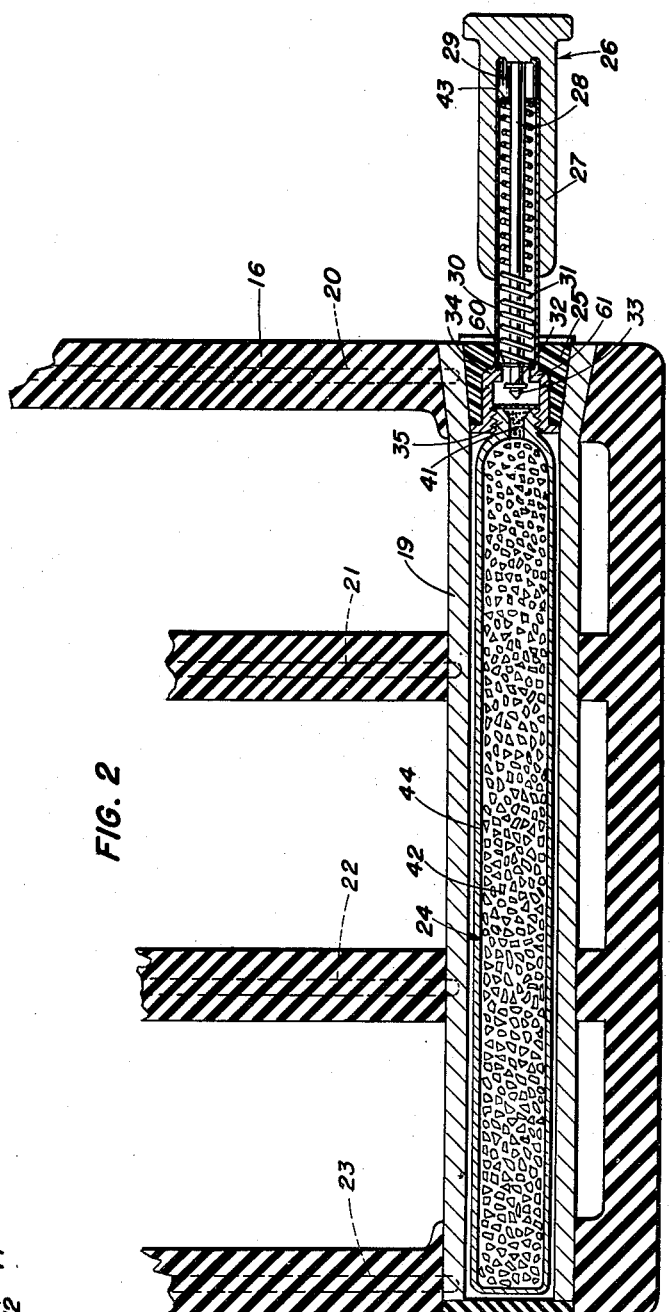
INVENTORS
DAVID J. CARLSON
HAROLD T. DECOT
BY *G. D. O'Brien*
ATTORNEY Oct. 28, 1952     D. J. CARLSON ET AL     2,615,933
BATTERY HEATING SYSTEM
Filed Sept. 29, 1949     2 SHEETS—SHEET 2
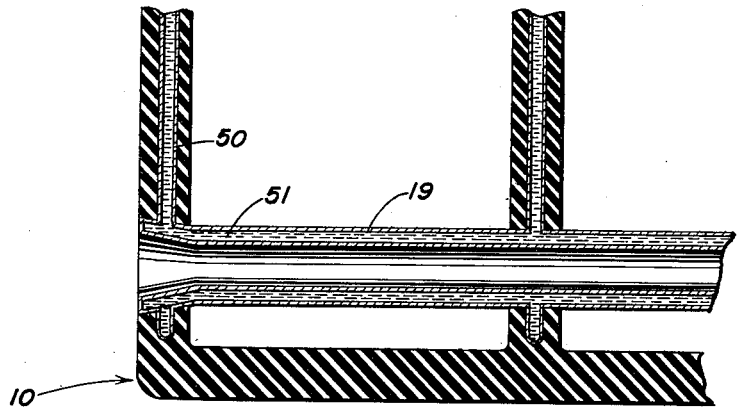
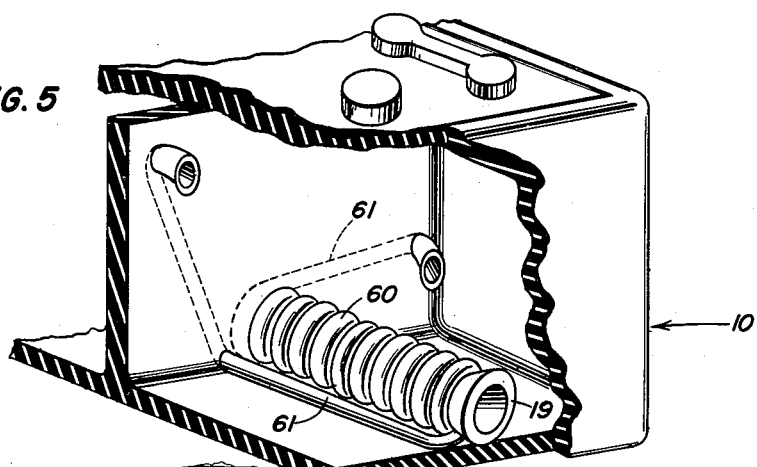
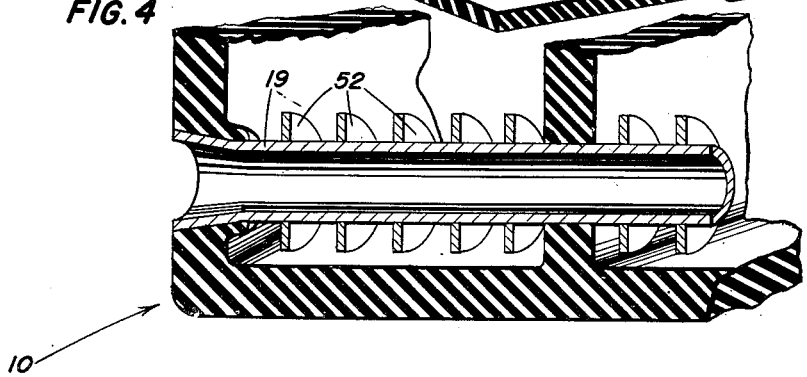
INVENTORS
DAVID J. CARLSON
HAROLD T. DECOT
BY *G. D. O'Brien*
ATTORNEY Patented Oct. 28, 1952

2,615,933

UNITED STATES PATENT OFFICE 2,615,933

BATTERY HEATING SYSTEM

David J. Carlson, Vienna, and Harold T. Decot, Arlington, Va.

Application September 29, 1949, Serial No. 118,662

10 Claims. (Cl. 136—161)

(Granted under the act of March 3, 1883, as amended April 30, 1928; 370 O. G. 757)

The present invention relates to battery heating systems and more particularly to a battery heating system designed to rapidly and efficiently transmit heat from a central source to various portions of the battery to elevate its temperature and consequently improve its efficiency during low ambient temperature operation.

It is well known that the output of a battery is a function of temperature and that low temperatures, below the optimum operating temperature of the battery, substantially reduce the output obtainable therefrom. In order to elevate the temperature of a battery during cold weather operation or under temperature conditions substantially below the optimum operating temperature thereof, various devices have been employed. Such devices include, for example, an electric heater positioned either outside or inside the battery casing and energized from an independent current source or by the battery itself, an electric heating pad positioned about the battery and supplied with current usually from an independent source, or a heated fluid medium piped through or around the battery. Among the disadvantages of the foregoing methods and devices is the necessity for supplying a relatively cumbersome independent energy source, or when the battery itself is used as the energy source, the resultant dissipation thereof, and the inefficiency of the devices resulting in a long time delay from the commencement of the heating operation until the battery has attained the desired temperature.

The present invention contemplates in its preferred embodiment the use of a relatively small and compact cartridge as the heat source, preferably of the type containing a readily oxidizable metal powder and a non-gaseous oxidizing agent, and a heat conducting system cooperating with said heat generating cartridge to quickly and efficiently transmit the heat generated to the various parts of the battery, resulting in a relatively rapid rise in temperature thereof to obtain the greater output of the battery.

It is therefore one object of the present invention to provide a means for rapidly increasing the temperature of a battery when operating under low ambient temperature conditions so as to obtain the more desirable operating characteristics of a battery at higher temperatures.

Another object of the present invention is to provide a heat conducting system for a battery which operates to conduct heat rapidly and efficiently from a central high temperature source to various parts of the battery.

Another object of the present invention is to provide for elevating the temperature of a battery by providing a heat conducting system for conducting heat applied to a localized portion thereof to various parts of a battery.

Another object of the present invention is to provide for varying the temperature of a battery in accordance with the temperature applied to a localized heat transfer means by cooperation therewith of a heat transmitting network.

A further object of the present invention is to provide for the inserting of a heat generating cartridge into the battery casing and for transmitting the heat generated thereby to various portions of the battery by a suitable heat conducting system.

Other objects and advantages of the present invention will become apparent to those skilled in the art from the following detailed description of the present invention made in conjunction with the accompanying drawings wherein:

Fig. 1 is a perspective view of a storage battery casing designed to receive a heat generating cartridge, and of a heat generating cartridge and a percussion primer therefor, the battery having its walls partially cut away to show a heat conducting system;

Fig. 2 is a partial longitudinal section of the lower portion of a battery casing taken through the cartridge receiving means and showing the cartridge inserted therein and the percussion primer attached thereto;

Figs. 3 and 4 are partial longitudinal sections of the battery casing taken through the cartridge receiving means with the cartridge removed therefrom showing modifications of the heat transmitting network; and Fig. 5 is a partial isometric view of the battery casing with the battery walls partially cut away showing another modification of the heat transmitting network.

For the purpose of the present detailed description of this invention, its application to a three cell storage battery 10, as shown in Fig. 1, is presented by way of example of one embodiment thereof. In the drawings the usual plates and separators have been omitted for clarity. The battery 10 is divided into the three cells 11, 12, and 13 by means of the casing partition walls 14 and 15 and the casing end walls 16 and 17. Also, as is conventional in this type of battery, the bottom of each cell is provided with a plurality of upstanding spaced ribs, indicated by the numeral 18. In addition, a tubularly or otherwise suitably shaped enclosed channel is formed near the bottom of the battery, centrally located between the sides and extending substantially the length thereof, by the insertion through the end and partition walls of the battery, through suitable openings formed therein, of a heat transfer tube 19 formed of any suitable material which is both acid resistant and a good conductor of heat. The afore-mentioned heat transmitting system or network comprises, in the present embodiment, lattices 20, 21, 22, and 23 formed of a suitable and preferably metallic heat conductor embedded in the walls 14, 15, 16, and 17, each heat conducting lattice being attached at its lower end to the tube 19, as shown in the drawings, to facilitate the conduction of heat therefrom to various portions of the battery.

The channel formed by the tube 19 is of suitable shape, size, and material to receive a heat generating cartridge 24 and to efficiently transmit the heat generated thereby to the heat conducting lattices and to the electrolyte solution of the battery. The heat generating cartridge is shown in enlarged longitudinal section in Fig. 2, and is preferably of the type generally known by its trade name as Heatron, comprising a metallic container 44 having an adapter 35 at one end for mounting a percussion primer 26 thereon, and containing within the main body thereof a mixture of readily oxidizable metal powders and nongaseous oxidizing agents generally indicated by the numeral 42; the principal metals and oxidizing agents utilized are zinc, iron, aluminum, manganese dioxide, and barium chromate. A percussion responsive primer material 41 is contained in the adapter end of the cartridge, which when initiated by the percussion primer 26, ignites the main charge 42. The amount of heat generated by the cartridge is controlled by the type and percentage of metal powders and oxidizing agents used. Thus, with the cartridge 24 inserted in the channel formed by the tube 19 and with the percussion primer 26 properly attached thereto, operation of the percussion primer excites the percussion responsive priming material igniting the heat generating charge of the cartridge to produce a determined quantity of heat. The heat thus generated is transmitted to the heat transfer cylinder 19 from which it is transmitted in part directly to the electrolyte solution of the battery 10, tending to heat the same by convection currents set up therein, and conducted in part to the heat transmitting network comprising the several lattices 20, 21, 22 and 23, thereby enabling heat to be applied to numerous portions of the battery.

The percussion primer 26 comprises a tubular casing 30 having a threaded adapter 34 at one end for engaging the threaded end 35 of the cartridge casing 30 and has an inwardly projecting shoulder 43 formed at the other end thereof to provide a spring abutment. The percussion primer is further provided with a handle 27 having a hollowed out portion 29 extending throughout a portion of its length enabling the handle to be slidably mounted on the casing 30. A plunger rod 28 is attached at one end to the base of the hollowed out portion 29 in the handle and extends beyond the open end thereof, thus passing through the interior of the tubular element 30 when the handle 27 is mounted on the exterior thereof. The free end of the plunger 28 is provided with a striker head 33 and a flange 32. A helical spring 31 is enclosed within the cylinder 30 and encompasses the plunger 28, extending from the free riding washer 60, mounted on rod 28 and contained by the shoulder 61 formed on the cylinder 30, to the shoulder 43 of said cylinder. Thus, when the handle 27 is caused to move in a direction away from the heat generating cartridge 24 as shown in Fig. 2, it causes a corresponding withdrawal of plunger 28 through the cylinder 30, causing the shoulder 32 on rod 28 to engage washer 60 and to move it therewith, resulting in a compression of the helical spring 31, and upon release of the handle 27, the force of the compressed spring 31 causes the striker 33 to hit the cartridge primer and thus initiate the desired heat producing reaction, resulting in the desired elevation of the battery temperature in the manner afore-described.

As indicated in Fig. 2, the opening in the cylindrical tube 19 for receiving the heat generating cartridge may be tapered in order to receive and securely hold the stopper 25 mounted on the adapter end of the percussion primer 26. The stopper, cooperating with the tapered opening, enables the secure positioning of the heat generating cartridge in operative position within the tube 19 with the percussion primer 26 attached thereto, thereby enabling the desired operation of the device.

Modifications of the present invention from the specific embodiment herein above-described within the spirit and scope of the present invention, as defined by the appended claims, will be apparent to those skilled in the art. For example, the tube 19 may extend through both end walls 16 and 17 to enable the introduction of the cartridge 24 from either end, but if desired may extend through wall 16 and only up to wall 17, thus leaving it closed at one end and minimizing the loss of heat that would result from an open end therein. In addition, heat transmitting systems other than the lattices 20, 21, 22, and 23 may be employed. One other example of such a heat transmitting means comprises a nonfreezing liquid system whereby the heat would be transmitted to the various portions of the battery by means of a piping or tubing 50 embedded in the battery casing and containing the desired fluid 51, as shown in Fig. 3. This system would operate similarly to the conventional hot water system in which the natural tendency of the hot fluid to rise would be utilized in transmitting the generated heat to the various portions of the battery.

Another such modification includes the use of heat exchange plates or fins 52 extending or radiating from the tube 19 into the electrolyte solution of the various cells of the battery, as shown in Fig. 4. This modification may be used by itself or in conjunction with any one or combination of the above-described heat transferring systems or any other suitable system.

A further modification contemplates the use of a coil of tubing 60 or other heat conductor convoluted about the tube 19, the ends 61 of which may be molded into the battery casing as indicated in Fig. 5, the coil operating to heat the electrolyte solution directly, and the ends of the coil transmitting heat to various parts of the battery casing. In the event that hollow tubing is employed as the transmitting network in the present modification, one open end thereof may be positioned in an upper portion of the battery, while the other end thereof may be positioned in a lower portion thereof, as shown in Fig. 5, thus providing for a heat circulating means wherein the electrolyte itself is heated directly in the coil and serves as the heat distributing means as it circulates through the casing walls in the tubing. It is apparent that in this modification the coil 60, particularly when formed of open ended hollow tubing, need not be embedded in the battery walls at all, but if desired, may provide only for the circulation of electrolyte therethrough. The heating of the battery walls is an advantage of the instant system which may be availed of if desired. Furthermore, this system provides the additional feature of positively circulating the electrolyte besides heating it, further enhancing the characteristics of the battery. Other modifications equally within the scope of the present invention will be apparent to those skilled in the art.

In keeping with the previously stated possible modifications, it should be understood that the percussion type primer 26 is not necessarily adhered to for activating the heat generating cartridge. Any known kind of primer may be substituted, and if the primer is of the electrical type it would be equipped with a simple electrical circuit and closer therefor.

Although specifically described in its application to the heating of a multi-cell storage battery, the present invention is equally applicable to single cells, to dry cells, and to batteries of all types. Further, the present invention is not limited to the use of a Heatron type of heat generator. The present invention contemplates the use of any suitable compact device which can function in cooperation with a battery outfitted in the manner herein described to elevate the temperature thereof, or generally the application of heat to the channel formed by the tube 19 as, for example, the piping of a heated fluid therethrough. Also, by the application of a suitable cooling medium to the channel or tube, it is apparent that the battery may be cooled when its temperature is excessive. Modifications of the present invention to adapt it to these several applications, and the various types of heating or cooling means adaptable thereto will be apparent to those skilled in the art and are considered within the scope of the present invention.

In the operation of the present device, the percussion primer 26 is attached to the adapter end 35 of the heat generating cartridge, and the cartridge is inserted in the tube 19 until the stopper 25 on the percussion primer securely engages the flanged portion thereof. Thereupon the handle 27 of the percussion primer is drawn out to compress the helical spring 31 and then released causing the percussion head 33 thereof to hit the cartridge primer, thus igniting the charge thereof and causing the desired elevation of the battery temperature. The size and heat generating capacity of the cartridge to be used is dependent upon the size and design of the battery and the ambient temperature. Once the temperature of the battery has been thus raised, its internal resistance during operation tends to maintain it at the elevated temperature.

The invention described herein may be manufactured and used by or for the Government of the United States of America for governmental purposes without the payment of any royalties thereon or therefor.

What is claimed is:

1. A battery having a heat conducting system comprising a heat transfer tube for containing a heat generating cartridge, said tube mounted wholly within the battery and extending into the electrolyte chamber of the battery, and a heat transmitting network extending to divers portions of said battery and contacting said heat transfer means, said transfer means functioning to transfer heat from the cartridge to the battery electrolyte directly and said network cooperating therewith to diversify the heat transfer effect to vary the temperature of the battery in accordance with the temperaure applied to said transfer means.

2. A battery casing having a heat conducting system comprising a heat transfer tube for containing a heat generating cartridge, said tube mounted wholly within the battery and extending into the electrolyte chamber of said battery to form a channel therein, and a heat transmitting network embedded in the walls of said casing and contacting said tube, said tube functioning to heat the electrolyte directly from heat emitted from said cartridge and said network functioning to distribute heat applied to said tube to various parts of the battery.

3. A battery casing having a heat conducting system comprising a heat transfer means for substantially entirely containing means to affect the temperature of the transfer means and extending into the electrolyte chamber of the battery, and a metallic heat transmitting lattice embedded in the walls of said casing and contacting said heat transfer means, said transfer means functioning to transfer heat to and from the battery elecrolyte directly in accordance with the temperature applied to said transfer means by said temperature affecting means and said lattice cooperating therewith to extend the heat transfer effect to divers portions of the battery.

4. A battery casing having a heat conducting system comprising a heat transfer means for substantially entirely containing means to affect the temperature of the transfer means and extending into the electrolyte chamber of the battery, and a fluid heat transmitting network embedded in the walls of said casing and contacting said heat transfer means, said transfer means functioning to transfer heat to and from the battery electrolyte directly in accordance with the temperature applied to said transfer means by said temperature affecting means and said network cooperating therewith to extend the heat transfer effect to divers portions of the battery.

5. A battery casing having a heat conducting system comprising a heat transfer means for substantially entirely containing means to affect the temperature of the transfer means extending into the electrolyte chamber of the battery, and heat transmitting fins extending therefrom, said transfer means functioning to transfer heat to and from the battery electrolyte directly in accordance with the temperature applied to said transfer means and said fins cooperating therewith to enhance the heat transfer effect of said transfer means.

6. A battery casing having a heat conducting system comprising a heat transfer cylinder extending into the electrolyte chamber of the battery and an open ended heat transmitting network in part convoluted about said cylinder and in part embedded in the walls of said casing, the open ends of said network being positioned in the electrolyte chambers of the battery to provide a convection induced path for the electrolyte, said cylinder functioning to transfer heat to or from the battery electrolyte in accordance with the relative temperature of the cylinder and electrolyte and said network cooperating with said cylinder to diversify the heat transfer effect to divers portions of the battery.

7. A battery casing having a heat conducting system comprising a heat transfer means extending into the electrolyte chamber of the battery, and a heat transmitting means comprising an open ended tube convoluted about the transfer means and the open ends thereof being positioned in the electrolyte chamber of the battery, said transfer means functioning to transfer heat to or from the battery electrolyte in accordance with the temperature applied to said transfer means and the transmitting means cooperating therewith to enhance the heat transfer effect by providing a convection induced circulation path for the battery electrolyte.

8. A battery casing having a heat conducting system comprising a heat transfer means contained wholly within the battery and extending into the electrolyte chamber thereof, and an open ended tube in contact with said transfer means and having its ends located at different parts of the battery, said transfer means functioning to transfer heat to or from the battery electrolyte in accordance with the temperature applied to said transfer means and said tubing providing a convection induced circulation path for the battery electrolyte.

9. A battery casing having a heat conducting system comprising a heat transfer means for substantially entirely receiving means to affect the temperature of the heat transfer means, and a heat transmitting network extending to divers portions of said battery and contacting said heat transfer means, said transfer means functioning to transfer heat directly to and from the battery electrolyte in accordance with the temperature applied to said transfer means by said temperature affecting means and said network cooperating therewith to enhance the heat transfer effect of the heat transfer means.

10. A battery casing having a heat conducting system comprising a heat transfer means for receiving a cartridge to affect the temperature of the heat transfer means, and a heat transmitting network extending to divers portions of said battery and contacting said heat transfer means, said transfer means functioning to transfer heat directly to and from the battery electrolyte in accordance with the temperature applied to said transfer means by said cartridge and said network cooperating therewith to enhance the heat transfer effect of the heat transfer means.

DAVID J. CARLSON.
HAROLD T. DECOT.

REFERENCES CITED

The following references are of record in the file of this patent:

UNITED STATES PATENTS

| Number | Name | Date |
|---|---|---|
| 982,493 | Hickley | Jan. 24, 1911 |
| 1,615,166 | Cowles | Jan. 18, 1927 |
| 2,273,244 | Ambruster | Feb. 17, 1942 |
| 2,282,923 | Ambruster | May 12, 1942 |
| 2,412,898 | Marbury et al. | Dec. 17, 1946 |
| 2,418,792 | Riggs | Apr. 8, 1947 |
| 2,510,235 | Kogel | June 6, 1950 |

FOREIGN PATENTS

| Number | Country | Date |
|---|---|---|
| 596,999 | France | Nov. 5, 1925 |
| 302,296 | Italy | Oct. 24, 1932 |
| 57,725 | Norway | Mar. 15, 1937 |
| 823,048 | France | Jan. 12, 1938 |
| 912,338 | France | Aug. 6, 1946 |

OTHER REFERENCES

Modern Plastics, "Plastics," February 1944, page 114.

Electronic Engineering, "New Chemical Soldering Iron," June 1949, page 222.